(12) United States Patent
Yokota et al.

(10) Patent No.: US 7,678,173 B2
(45) Date of Patent: Mar. 16, 2010

(54) PB-FREE COPPER-ALLOY SLIDING MATERIAL

(75) Inventors: Hiromi Yokota, Aichi (JP); Daisuke Yoshitome, Aichi (JP); Hiroaki Kobayashi, Aichi (JP); Hiroyuki Kawaguti, Aichi (JP)

(73) Assignee: Taiho Kogyo Co., Ltd., Toyota-Shi Aichi (JP)

( * ) Notice: Subject to any disclaimer, the term of this patent is extended or adjusted under 35 U.S.C. 154(b) by 124 days.

(21) Appl. No.: 10/585,993

(22) PCT Filed: Jan. 13, 2005

(86) PCT No.: PCT/JP2005/000302

§ 371 (c)(1),
(2), (4) Date: Jul. 13, 2006

(87) PCT Pub. No.: WO2005/068671

PCT Pub. Date: Jul. 28, 2005

(65) Prior Publication Data

US 2008/0095658 A1    Apr. 24, 2008

(30) Foreign Application Priority Data

Jan. 15, 2004    (JP)    ............... 2004-008205

(51) Int. Cl.
*B22F 9/00*    (2006.01)
*C22C 5/00*    (2006.01)
*C22C 9/02*    (2006.01)
*C22C 9/00*    (2006.01)
*C22C 9/06*    (2006.01)

(52) U.S. Cl. ............... 75/246; 420/472; 420/496; 420/499

(58) Field of Classification Search ............... 75/246; 420/472, 496, 499
See application file for complete search history.

(56) References Cited

U.S. PATENT DOCUMENTS 6,652,675 B2    11/2003    Sakai et al.

(Continued)

FOREIGN PATENT DOCUMENTS

GB    2 355 016 A    4/2001

(Continued)

OTHER PUBLICATIONS

Pre-lecture Paper of Tribology Conference of Tribology Institute of Japan (Tokyo May 2003).

(Continued)

*Primary Examiner*—Roy King
*Assistant Examiner*—Caitlin Fogarty
(74) *Attorney, Agent, or Firm*—Birch, Stewart, Kolasch & Birch, LLP

(57) ABSTRACT

In a Pb-free copper-based sintered alloy containing from 1 to 30% of Bi and from 0.1 to 10% of hard matter particles having from 10 to 50 μm of average particle diameter, the Bi phase has a smaller average particle diameter than that of the hard matter particles and is dispersed in the Cu matrix, or the hard matter particles having 50% or less of a contact length ratio with the Bi phase based on the total circumferential length of the hard particle, which are in contact with said Bi phase, are present in a ratio of 70% or more based on the entire number of the hard matter particles.

6 Claims, 1 Drawing Sheet

U.S. PATENT DOCUMENTS

| | | |
|---|---|---|
| 2001/0019779 A1 | 9/2001 | Sakai et al. |
| 2003/0064239 A1 | 4/2003 | Saitou et al. |
| 2006/0000527 A1 | 1/2006 | Yokota et al. |
| 2008/0095658 A1 | 4/2008 | Yokota et al. |

FOREIGN PATENT DOCUMENTS

| | | |
|---|---|---|
| JP | 61-73849 A | 4/1986 |
| JP | 03-247732 A | 11/1991 |
| JP | 04-028836 A | 1/1992 |
| JP | 7-9046 B2 | 2/1995 |
| JP | 8-19945 B2 | 3/1996 |
| JP | 10-046272 A | 2/1998 |
| JP | 10-330868 A | 12/1998 |
| JP | 2001-081523 A | 3/2001 |
| JP | 2001-107106 A | 4/2001 |
| JP | 2001-220630 A | 8/2001 |
| JP | 2001-240925 A | 9/2001 |
| JP | 2002-12902 A | 1/2002 |
| JP | 34217124 B2 | 4/2003 |
| JP | 2005-200703 A | 7/2005 |
| JP | 2005-350722 A | 12/2005 |

OTHER PUBLICATIONS

Office Action dated Oct. 10, 2006 (issued in U.S. Appl. No. 11/148,186).
Office Action dated May 7, 2007 (issued in U.S. Appl. No. 11/148,186).
Office Action dated Nov. 6, 2007 (issued in U.S. Appl. No. 11/148,186).
Office Action dated May 5, 2008 (issued in U.S. Appl. No. 11/148,186).
Office Action dated Jun. 5, 2008 (issued in U.S. Appl. No. 11/148,186).
Office Action dated Aug. 19, 2008 (issued in U.S. Appl. No. 11/148,186).
Office Action dated Mar. 9, 2009 (issued in U.S. Appl. No. 11/148,186).
Office Action dated Jul. 27 2009 (issued in U.S. Appl. No. 11/148,186).
Office Action dated Aug. 13, 2009 (issued in U.S. Appl. No. 11/148,186).

PB-FREE COPPER-ALLOY SLIDING MATERIAL

TECHNICAL FIELD

The present invention relates to a copper-based sintered alloy. More particularly, the present invention relates to a copper-based sintered alloy, which is free of Pb but exhibits improved sliding properties.

BACKGROUND TECHNIQUE

Pb, which is ordinarily added to the copper-alloy for sliding use, expands and is elongated on the sliding surface upon temperature rise during the sliding. As a result, because Pb cools the sliding surface and simultaneously realizes its excellent self-lubricating properties, seizure is, consequently, prevented. In addition, since Pb forms a soft dispersing phase, Pb has conformability and such property that foreign matters are embedded in Pb.

However, Pb is liable to be corroded by acids other than sulfuric acid. When Pb is present in the form of coarse particles in the Cu alloy, the load ability of a bearing is lowered. Therefore, Patent Document 1 (Japanese Examined Patent Publication (kokoku) Hei 8-19945) proposes to disperse Pb in the form of fine particles expressed by a particular calculation equation. The equation can be interpreted to mean the following. The total Pb particles in the visual field of $0.1$ mm$^2$ ($10^5$ μm$^2$) are observed. The average area ratio of these particles is converted to one particle, which is 0.1% or less. According to an example of this publication, a Cu—Pb—Sn pre-alloy powder is used. In addition, it is described that a finer Pb structure is obtained at lower sintering temperature. It is, therefore, understood that the technique employed in this publication is to suppress the precipitation and growth of Pb by low-temperature sintering.

It is known from Patent Document 2 (Japanese Examined Patent Publication (kokoku) No. Hei 7-9046 that, in order to enhance the wear resistance of the sintered copper alloy, such carbides as $Cr_2C_3$, $Mo_2C$, WC, VC and NbC are added in the sintered copper alloy as hard matters. According to this publication, the copper-alloy powder having from 10 to 100 μm of average particle-diameter and the hard-matter powder having 5 to 150 μm of the average particle-diameter are mixed by a V type blender, followed by compacting and sintering. The description that Pb is present in the grain boundaries of the copper particles (column 4, lines 21 through 22) is not inconsistent with knowledge derived from an equilibrium phase diagram, that is, Pb is hardly not dissolved in the solid Cu.

A Pb-free alloy, which attains the sliding properties equivalent to the Cu—Pb based sintered alloy, is known from Patent Document 3 (Japanese Unexamined Patent Publication (kokai) No. Hei 10-330868. It is apparent from the drawings of this publication that the location of the Bi (alloy) phase is the grain-boundary triple points and the grain boundaries in the vicinity to the triple points.

It is proposed in Patent Document 4 (Japanese Patent No. 3421724) that the hard matters incorporated into the Pb or Bi phase prevent Pb and Bi from flowing out of the sintered copper alloy; the Pb or Bi phase behaves as a cushion of the hard matters, the attacking property of which against the opposite shaft is mitigated; the separated hard matters are again captured by the Pb or Bi phase, thereby mitigating abrasive wear. In this patent, the presence of the hard matters is such that they are enveloped in the Bi phase. The dimension of the Bi phase is, therefore, larger than that of the hard matters.

It is disclosed in Patent Document 5 (Japanese Unexamined Patent Publication (kokai) No. 2001-220630) that an intermetallic compound is added to enhance the wear resistance of the Cu—Bi(Pb) based sintered alloy; its micro-structure is such that the intermetallic compound is present around the Bi or Pb phase. During sliding, the intermetallic compound is convex and the Bi or Pb phase as well as the Cu matrix are concave on the surface of copper alloy to form oil reserving portions. As a result, seizure resistance and fatigue resistance of the sliding material are improved. An example of the sintering condition proposed is from 800 to 920° C. for approximately 15 minutes.

Patent Document 1: Japanese Examined Patent Publication (kokoku) No. Hei 8-19945
Patent Document 2: Japanese Examined Patent Publication (kokoku) No. Hei 7-9046
Patent Document 3: Japanese Unexamined Patent Publication (kokai) No. Hei 10-330868
Patent Document 4: Japanese Patent No. 3421724
Patent Document 5: Japanese Unexamined Patent Publication (kokai) No. 2001-220630
Patent Document 6: Japanese Unexamined Patent Publication (kokai) No. 2002-12902

DISCLOSURE OF INVENTION

Problems to be Solved by Invention

Pb and Bi are hardly not dissolved in the Cu matrix of the solid Cu alloy. In addition, neither Pb nor Bi forms an intermetallic compound. Pb and Bi form, therefore, a phase different from the Cu matrix. Such micro-structure and properties are utilized as the conformability of the copper alloy for sliding use. On the other hand, the Pb and Bi phases are a low-strength portion and hence incur reduction of fatigue resistance. Consequently, the low-temperature sintering proposed in Patent Document 1 refines the Pb phase and is hence effective for lessening the drawbacks mentioned above. However, the low temperature required for suppressing the growth of Pb disadvantageously lowers the bonding strength of the copper alloy particles.

The Bi phase in the Cu—Bi based alloys proposed in Patent Documents 3, 4 and 5 results in exudation or corrosion when the alloys are used at high temperature or in the degraded oil. As a result, the Bi content is decreased to a level lower than the added amount, thereby lowering the sliding performance. In addition, Bi may be dissolved out into the lubricating oil. However, when Bi is finely dispersed, the volume of each Bi phase is so small that exudation, corrosion and decrease in the Bi amount can be suppressed. Fine dispersion of Bi and the sintering property of the copper alloy have an opposite relationship with one another.

During sintering of the Bi-containing Cu-based alloys proposed in Patent Document 4 and Patent Document 5, the Bi phase is rendered a liquid phase, into which the components of the Cu matrix are liable to diffuse and form an intermetallic compound there. The intermetallic compound is, therefore, always present at the boundaries of the Bi phase and the Cu matrix. The holding effect of the intermetallic compound by the Cu matrix is, accordingly, low. Since the desired microstructure is not obtained by ordinary sintering, the sintering is carried out for a long period of time to obtain the desired structure in Patent Document 5. It is understood that: as a result of the sintering for a long period of time, the size of the Bi phase becomes larger than that of hard particles as shown in FIG. 2 of Patent Document 4; and, the presence ratio of hard particles described below is almost 100%. In addition, FIG. 1 of Patent Document 5 shows a high "hard matter contact ratio" described herein below. Such Bi phase is the reason that fatigue resistance and corrosion resistance of the Cu—Bi based sintered alloy are reduced.

Means for Solving Problem

As is described hereinabove, the conformability, fatigue resistance and corrosion resistance could not be compatible at a high level in the conventional Cu—Bi based alloy. The first invention provided taking into consideration of the above points resides in the Pb-free copper-based sintered alloy, characterized in that it has a composition containing from 1 to 30% by mass of Bi and from 0.1 to 10% by mass of hard matter particles having from 10 to 50 μm of average particle diameter, the balance consisting of Cu and unavoidable impurities, and, further, the Bi phase having smaller average particle diameter than that of the hard matter particles is dispersed in the Cu matrix. The second invention provided taking into consideration of the above points resides in the Pb-free copper-based sintered alloy, characterized in that it has a composition containing from 1 to 30% by mass of Bi and from 0.1 to 10% by mass of hard matter particles having from 10 to 50 μm of average particle diameter, the balance consisting of Cu and unavoidable impurities, and, further, the hard particles having 50% or less of a contact length ratio with the Bi phase based on the total circumferential length of the hard particle, which is in contact with said Bi phase, are present in the ratio of 70% or more based on the entire number of the hard matter particles.

The present invention is described in detail hereinafter.

(1) Alloy Composition

When the Bi content of the Cu—Bi based sintered alloy according to the present invention is less than 1% by mass, seizure resistance is poor. On the other hand, when the Bi content is more than 30% by mass, the strength is low and fatigue resistance is poor. The Bi content is, therefore, from 1 to 30% by mass, and preferably from 1 to 15% by mass.

In the present invention, the hard matter particles may be those proposed in Patent Document 2, but is preferably such Fe-based compound as $Fe_2P$, $Fe_3P$, $FeB$, $Fe_2B$ and $Fe_3B$, which is well sintered with the copper alloy. Since the Fe-based compound has low wettability with Bi and on the contrary high wettability with Cu, the contact ratio of the Bi phase with the hard particles is so low that the hard particles are liable to be held by the Cu matrix. This leads to the effect that the hard particles are difficult to be separated, and, further the hard particles are difficult to fracture. Reduction of wear resistance and seizure resistance due to the separation and fracture of the hard particles mentioned above can, therefore, be suppressed. When the content of the hard matters is less than 0.1% by mass, the seizure resistance and the wear resistance are poor. On the other hand, when the content of the hard matters exceeds 10% by mass, the strength is low, and, not only is fatigue resistance poor, but also the opposite material is abraded by the hard matters and the sintering property is lowered. Preferable content of the hard matters is from 1 to 5% by mass.

The balance of the composition described herein above is unavoidable impurities and Cu. The impurities are ordinary ones. Among them, Pb is also at an impurity level.

If necessary, an additive element(s) may be added to the copper alloy. For example, 0.5% by mass or less of P may be added to lower the melting point of Cu and enhance the sintering property. When the P content exceeds 0.5% by mass, the copper alloy embrittles. From 1 to 15% by mass of Sn may be added to enhance the strength and fatigue resistance. When the Sn content is less than 1% by mass, it is only slightly effective for strengthening. On the other hand, when the Sn content exceeds 15% by mass, an intermetallic compound is liable to form and the alloy embrittles. In addition, from 0.1 to 5% by mass of Ni may be added to enhance the strength and fatigue resistance. When the Ni content is less than 0.1% by mass, Ni is only slightly effective for strengthening. On the other hand, when the Ni content exceeds 5% by mass, an intermetallic compound is liable to form and the alloy embrittles. These elements are alloyed in Cu and constitute the matrix of the copper alloy.

In addition, such solid lubricant as $MoS_2$ and graphite may be added in an amount of 5% by weight or less as a complex component of the copper alloy.

(2) Micro-Structure of Alloy

In the present first and second inventions, the average particle diameter of the hard matter particles is from 10 to 50 μm. When the average particle diameter is less than 10 μm, the hard matters are only slightly effective for wear resistance. On the other hand, when the average particle diameter exceeds 50 μm, the strength of the sintered copper alloy is lowered. Preferable average particle diameter of the hard matter particles is from 15 to 30 μm.

The micro-structure of the alloy according to the present invention is such that the flow of the Bi phase is suppressed to as low as possible during sintering of the copper alloy, which flow causes the contact between the hard matter particles and the Bi phase.

The conclusion mentioned above is specified in the present first invention as $D_{Bi} < D_H$, wherein $D_{Bi}$ is the average particle diameter of the Bi phase corresponding to a circle of the Bi phase, and, further, $D_H$ is the average particle diameter of the hard matters added.

In the present second invention, the Bi phase in contact with the hard matter particles is specified as follows. The contact length ratio of the hard matter particles with the Bi phase based on the total circumferential length of the hard matter particle, which is in contact with said Bi phase is, 70% or less. The presence ratio of the hard matter particles having 50% or less of the contact length is 70% or more of total hard matter particles. The "contact length ratio of the hard matter particles with the Bi phase based on the total circumferential length of the hard matter particle, which is in contact with said Bi phase is referred to as "the hard matter contact ratio". When the hard matter contact ratio is 100%, one or more hard matter particles are in contact with a particular one Bi phase at the entire periphery of the hard particle(s). This readily indicates the hard matter particles are enveloped in the Bi phase. On the other hand, when the hard matter contact ratio is less than 100% but not 0, the hard matter particle(s) has necessarily a portion protruding out of the Bi phase, and this portion is in contact with the Cu alloy. In the present invention, the hard matter contact ratio is 50% or less so as to decrease the contact between the hard particles and the Bi phase to as small as possible, thereby thoroughly demonstrating the respective properties of the hard particles and the Bi phase.

Next, the number ratio of the hard particles having 50% or less of the hard matter contact ratio relative to the entire hard particles is referred to as "the presence ratio of hard matters". When the presence ratio of hard matters is 100%, all of the hard matter particles have 50% or less of the hard matter contact ratio. On the other hand, when the presence ratio of hard matters is 0%, all of the hard particles have more than 50% of the hard matter contact ratio. In the present invention, the presence ratio of hard matters is limited to 70% or more, because the hard particles and the Bi phase slightly in contact with one another are relatively increased, thereby thoroughly demonstrating their respective properties.

In order to realize the sintering process as described hereinabove, the Cu—Bi pre-alloy atomized powder or mixture of the Cu (alloy) atomized powder and the Cu—Bi alloy powder are preferably sintered for a short period by holding time of 2 minutes or less at the sintering temperature. Such short-time sintering can be carried out by means of the high-frequency sintering proposed by the present applicant in Patent Document 6 (Japanese Unexamined Patent Publication (kokai) No. 2002-12902).

(3) Properties of Alloy

Generally speaking, in the copper-based sintered alloy according to the present invention, the Bi phase exhibits conformability. The hard matter particles are firmly held by the Cu matrix and are difficult to separate from the Cu matrix. As a result, wear resistance and seizure resistance are enhanced, and strength and fatigue resistance are improved.

(a) Since the Bi phase is finely dispersed in the entire sintered alloy, the properties of the material body are improved in the points of fatigue resistance, corrosion resistance and strength.

(b) Since most of the hard matter particles are held by the Cu or copper-alloy matrix, the material at the sliding surface exhibits improved wear resistance.

(c) Improved conformability is attained due to the Bi phase present on the sliding surface notwithstanding the absence of Pb.

(d) Finely dispersed Bi phase brings about improved non-adhesiveness and seizure resistance.

The present invention is hereinafter described with reference to the examples.

Best Mode for Carrying Out Invention

The Cu—Bi pre-alloy powder having a composition shown in Table 1 (the particle diameter-150 μm or less, the atomized powder) and the hard-particle powder (the average particle-diameter shown in Table 1) were mixed and sprayed on a steel sheet to a thickness of approximately 1 mm. The preliminary sintering was carried out in hydrogen reducing protective atmosphere at 750-1000° C. for 20-1800 seconds of the sintering time. Subsequently, the rolling and then the secondary sintering under the same conditions as the primary sintering were carried out, thereby obtaining the sintered products. These products were used as the test samples. The sintering condition for a long period of time within the sintering-time range was intended to promote the diffusion of the Bi phase and hence to prepare the comparative samples outside the present invention.

Testing Method of Seizure Resistance

The surface of the copper alloy prepared by the above described method was lapped by paper to provide 1.0 μm or less of the surface roughness (ten-point average roughness). A steel ball abutted on the so prepared sample material, and the steel ball under load was caused to slide in one direction. The steel ball after sliding was observed and the area of Cu alloy adhered on the steel ball was measured. Since the material liable to adhere has poor seizure resistance, are small adhered surface indicates improved seizure resistance.

Testing Machine: Stick-Slip Tester
Load: 500 g
Material of Shaft: SUJ2
Lubricating Oil: None
Temperature: gradual increase from room temperature to 200° C.

Corrosion Resistance

The surface of the test materials was finished to 1.0 μm of roughness, and the test materials were immersed in oil. Weight change before and after the immersion was measured. As the weight change a smaller, the corrosion resistance is better.

Kind of Oil: Degraded ATF
Oil Temperature: 180° C.
Time: 24 h

Fatigue Resistance

The fatigue strength and the tensile strength have good co-relationship. As the tensile strength is higher, fatigue resistance is more improved. The material strength (tensile strength) was measure by a tensile test stipulated by JIS and used as an alternative property of the fatigue strength.

The hard matter present ratio and the test results of the above mentioned properties are shown in Table 1.

TABLE 1

| | | Bi Amount (mass %) | Diameter Corresponding to Circle of Bi Phase (μm) | Amount of Hard Matters (mass %) | | | Average Particle Diameter of Hard Matters μm | Hard Matter Present Ratio % | Seizure Resistance Adhesion Area μm$^2$ | Fatigue Resistance Material Strength MPa | Corrosion Resistance Weight Decrease mg/cm$^2$ |
|---|---|---|---|---|---|---|---|---|---|---|---|
| | | | | Fe$_3$P | Fe$_2$P | FeB | | | | | |
| Examples | 1 | 3 | 5 | 2 | 1 | — | 15 | 89 | 12 | 264 | 0 |
| | 2 | 5 | 5 | 3 | 2 | — | 25 | 94 | 15 | 257 | 0.3 |
| | 3 | 5 | 8 | 4 | — | — | 25 | 91 | 11 | 262 | 0.2 |
| | 4 | 10 | 7 | 2 | 1 | — | 15 | 92 | 12 | 252 | 0.3 |
| | 5 | 10 | 12 | 4 | — | — | 25 | 86 | 8 | 230 | 0.2 |
| | 6 | 10 | 14 | 4 | 1 | — | 25 | 89 | 8 | 225 | 0.2 |
| | 7 | 10 | 18 | — | — | 5 | 24 | 84 | 6 | 220 | 0.2 |
| | 8 | 15 | 8 | 2 | — | — | 15 | 93 | 0 | 238 | 0.4 |
| | 9 | 15 | 17 | 2 | 3 | — | 25 | 91 | 0 | 214 | 0.3 |
| | 10 | 15 | 14 | — | — | 4 | 24 | 92 | 0 | 228 | 0.3 |
| | 11 | 15 | 13 | — | 3 | — | 25 | 91 | 0 | 232 | 0.3 |
| | 12 | 20 | 22 | 3 | 2 | — | 25 | 88 | 0 | 198 | 0.3 |
| | 13 | 20 | 28 | 7 | 3 | — | 32 | 86 | 0 | 176 | 0.5 |
| Comparative Examples | 1 | 0 | 0 | — | — | — | — | — | 100 | 348 | 0 |
| | 2 | 5 | 31 | 5 | — | — | 25 | 55 | 12 | 184 | 1.3 |
| | 3 | 10 | 52 | 3 | — | — | 25 | 32 | 25 | 175 | 1.6 |
| | 4 | 10 | 105 | 3 | 2 | — | 25 | 18 | 50 | 152 | 2.2 |

TABLE 1-continued

| | Bi Amount (mass %) | Diameter Corresponding to Circle of Bi Phase (μm) | Amount of Hard Matters (mass %) | | | Average Particle Diameter of Hard Matters μm | Hard Matter Present Ratio % | Seizure Resistance Adhesion Area μm² | Fatigue Resistance Material Strength MPa | Corrosion Resistance Weight Decrease mg/cm² |
|---|---|---|---|---|---|---|---|---|---|---|
| | | | Fe₃P | Fe₂P | FeB | | | | | |
| 5 | 15 | 68 | 2 | 1 | — | 25 | 25 | 50 | 145 | 3.4 |
| 6 | 20 | 127 | 5 | — | — | 25 | 12 | 50 | 123 | 5.3 |

As is apparent from Table 1, the inventive examples exhibit comprehensively improved, seizure resistance, fatigue resistance and corrosion resistance.

BRIEF EXPLANATION OF DRAWINGS

In FIGS. 1 and 2 are shown the microscopic photographs of the inventive example No. 4 at magnification of 200 times and 500 times, respectively. Similarly, in FIGS. 3 and 4 are shown the microscopic photographs of the comparative example No. 3 at the magnification of 200 times and 500 times, respectively. It is apparent that in the former FIGS. 1 and 2, the contact ratio of the hard matters and the Bi phase is small, while in the latter FIGS. 3 and 4 the contact ratio of the hard matters and the Bi phase is large.

INDUSTRIAL APPLICABILITY

Figure 1:
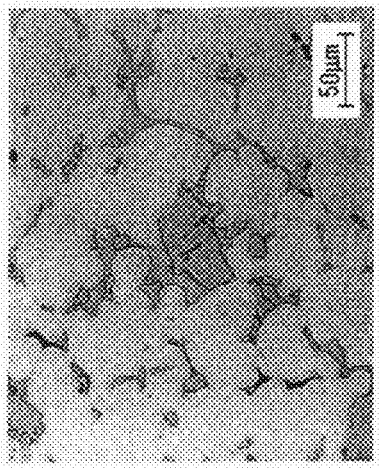
[FIG. 1] a photograph (200 times) showing a microscopic structure of the sintered copper alloy according to an example of the present invention.
Figure 2:
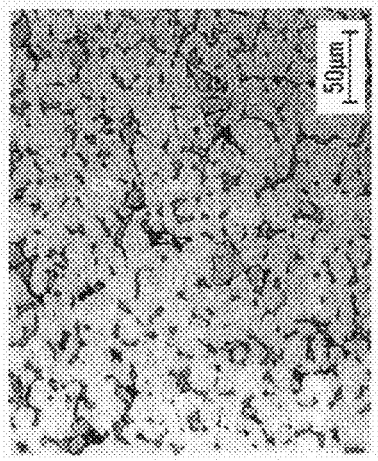
[FIG. 2] a photograph (500 times) showing a microscopic structure of the sintered copper alloy according to the example of the present invention.
Figure 3:
[FIG. 3] a photograph (200 times) showing a microscopic structure of the sintered copper alloy according to a comparative example.
Figure 4:
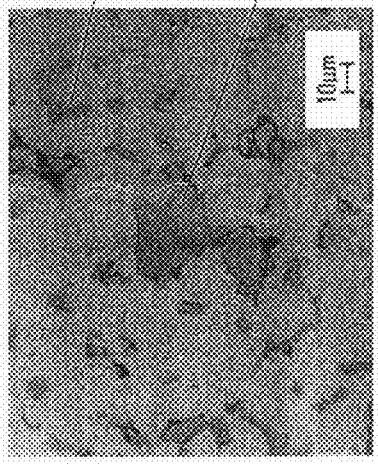
[FIG. 4] a photograph (500 times) showing a microscopic structure of the sintered copper alloy according to the comparative example.

The sintered copper alloy according to the present invention can be used for various bearings, for example AT (automatic transmission) bush and piston-pin bush. The high levels of conformability, wear resistance, seizure resistance and fatigue resistance achieved by the present invention are effectively utilized for these applications.

The invention claimed is:

1. A Pb-free copper-based sintered alloy, characterized in that it has a composition containing from 1 to 30% by mass of Bi and from 0.1 to 10% by mass of hard particles having from 10 to 50 μm of average particle diameter, the balance consisting of Cu and unavoidable impurities, and, further, the Bi phase having smaller average particle diameter than that of the hard particles is dispersed in a matrix of Cu.

2. A Pb-free copper-based sintered alloy, characterized in that it has a composition containing from 1 to 30% by mass of Bi, at least one of a group consisting of from 1 to 15% by mass of Sn, from 0.1 to 5% by mass of Ni, and 0.5% by mass or less of P, from 0.1 to 10% by mass of hard particles having from 10 to 50 μm of average particle diameter, the balance consisting of Cu and unavoidable impurities, and, further Bi phase having smaller average particle diameter than that of the hard particles is dispersed in a matrix of Cu.

3. A Pb-free copper-based sintered alloy, characterized in that it has a composition containing from 1 to 30% by mass of Bi and from 0.1 to 10% by mass of hard particles having from 10 to 50 μm of average particle diameter, the balance consisting of Cu and unavoidable impurities, and, further, the hard particles having 50% or less of a contact length ratio with the Bi phase based on the total circumferential length of the hard particle, which is in contact with said Bi phase, are present in a ratio of 70% or more based on the entire number of the hard particles.

4. A Pb-free copper-based sintered alloy, characterized in that it has a composition containing from 1 to 30% by mass of Bi, at least one of a group consisting of from 1 to 15% by mass of Sn, from 0.1 to 5% by mass of Ni, and 0.5% by mass or less of P, and from 0.1 to 10% by mass of hard particles having from 10 to 50 μm of average particle diameter, the balance consisting of Cu and unavoidable impurities, and, further the hard particles having 50% or less of a contact length ratio with the Bi phase based on the total circumferential length of the hard particle, which is in contact with said Bi phase, are present in a ratio of 70% or more based on the entire number of the hard particles.

5. A Pb-free copper-based sintered alloy according to any one of claims 1 through 4, wherein said hard particle is an Fe compound.

6. A Pb-free copper-based sintered alloy according to claim 5, wherein said Fe compound is selected from the group consisting of $Fe_2P$, $Fe_3P$, $FeB$, $Fe_2B$ and $Fe_3B$.

* * * * *